US012737923B2

(12) United States Patent
Yoshikawa

(10) Patent No.: US 12,737,923 B2
(45) Date of Patent: Sep. 15, 2026

(54) OBSERVATION APPARATUS AND OBSERVATION METHOD

(71) Applicant: KYOCERA Corporation, Kyoto (JP)

(72) Inventor: Atsushi Yoshikawa, Sagamihara (JP)

(73) Assignee: KYOCERA Corporation, Kyoto (JP)

( * ) Notice: Subject to any disclaimer, the term of this patent is extended or adjusted under 35 U.S.C. 154(b) by 216 days.

(21) Appl. No.: 18/852,082

(22) PCT Filed: Mar. 23, 2023

(86) PCT No.: PCT/JP2023/011629

§ 371 (c)(1),
(2) Date: Sep. 27, 2024

(87) PCT Pub. No.: WO2023/190075

PCT Pub. Date: Oct. 5, 2023

(65) Prior Publication Data

US 2025/0209668 A1 Jun. 26, 2025

(30) Foreign Application Priority Data

Mar. 29, 2022 (JP) ................................ 2022-054582

(51) Int. Cl.
*G06T 7/80* (2017.01)
*G01S 7/497* (2006.01)

(52) U.S. Cl.
CPC ................ *G06T 7/80* (2017.01); *G01S 7/497* (2013.01); *G06T 2207/10048* (2013.01); *G06T 2207/30232* (2013.01); *G06T 2207/30236* (2013.01)

(58) Field of Classification Search
CPC ............. G06T 7/80; G06T 2207/10048; G06T 2207/30232; G06T 2207/30236;
(Continued)

(56) References Cited

U.S. PATENT DOCUMENTS 10,171,802 B2 * 1/2019 Tanaka ...................... G06T 7/73
10,176,594 B2 * 1/2019 Tanaka ...................... G06T 7/80
(Continued)

FOREIGN PATENT DOCUMENTS

CN 108596982 A * 9/2018 .............. G06T 7/80
JP 2008-187564 A 8/2008
(Continued)

*Primary Examiner* — Fayyaz Alam
(74) *Attorney, Agent, or Firm* — Studebaker Brackett PLLC

(57) ABSTRACT

An observation apparatus includes a controller. The controller performs calibration based on a feature point set for a first region among the first region, a second region, and a third region and information on a position of the feature point in a real space. The controller acquires information on a position, in the real space, of a predetermined point in an observation region of a first sensor or an observation region of a second sensor. The first region corresponds to both the observation region of the first sensor and the observation region of the second sensor. The second region corresponds to the observation region of the first sensor and does not overlap the first region. The third region corresponds to the observation region of the second sensor and does not overlap the first region.

13 Claims, 7 Drawing Sheets

(58) Field of Classification Search
CPC .......... G06T 7/70; G01S 7/497; G01S 17/87; G01C 3/00; G01C 3/06
See application file for complete search history.

(56) References Cited

U.S. PATENT DOCUMENTS

| | | | | |
|---|---|---|---|---|
| 10,432,912 | B2 * | 10/2019 | Wendel | H04N 13/246 |
| 2008/0181488 | A1 * | 7/2008 | Ishii | B60R 1/27 382/154 |
| 2011/0050640 | A1 * | 3/2011 | Lundback | G06F 3/0488 345/175 |
| 2014/0118500 | A1 * | 5/2014 | Liu | G06T 7/80 348/46 |

FOREIGN PATENT DOCUMENTS

| | | | |
|---|---|---|---|
| JP | 2009-236569 | A | 10/2009 |
| JP | 2010-156609 | A | 7/2010 |
| JP | 2021-117087 | A | 8/2021 |

* cited by examiner 1
10
OBSERVATION APPARATUS
FIRST SENSOR
11
SECOND SENSOR
12
COMMUNICATION UNIT
13
STORAGE UNIT
14
CONTROLLER
15
20
TERMINAL APPARATUS
COMMUNICATION UNIT
21
INPUT UNIT
22
DISPLAY UNIT
23
STORAGE UNIT
24
CONTROLLER
25

FIG. 6

| FEATURE POINT | POSITION INFORMATION | FIRST COORDINATE SYSTEM | SECOND COORDINATE SYSTEM | THIRD COORDINATE SYSTEM |
|---|---|---|---|---|
| P11 | * * * | | ✓ | |
| P12 | * * * | | ✓ | |
| P13 | * * * | | ✓ | |
| P14 | * * * | | ✓ | |
| P15 | * * * | | ✓ | |
| P16 | * * * | ✓ | ✓ | |
| P17 | * * * | ✓ | ✓ | |
| P18 | * * * | ✓ | ✓ | |
| P19 | * * * | ✓ | | |
| P20 | * * * | ✓ | | |
| P21 | * * * | ✓ | | |
| P22 | * * * | ✓ | | ✓ |
| P23 | * * * | ✓ | | ✓ |
| P24 | * * * | ✓ | | ✓ |

FIG. 7

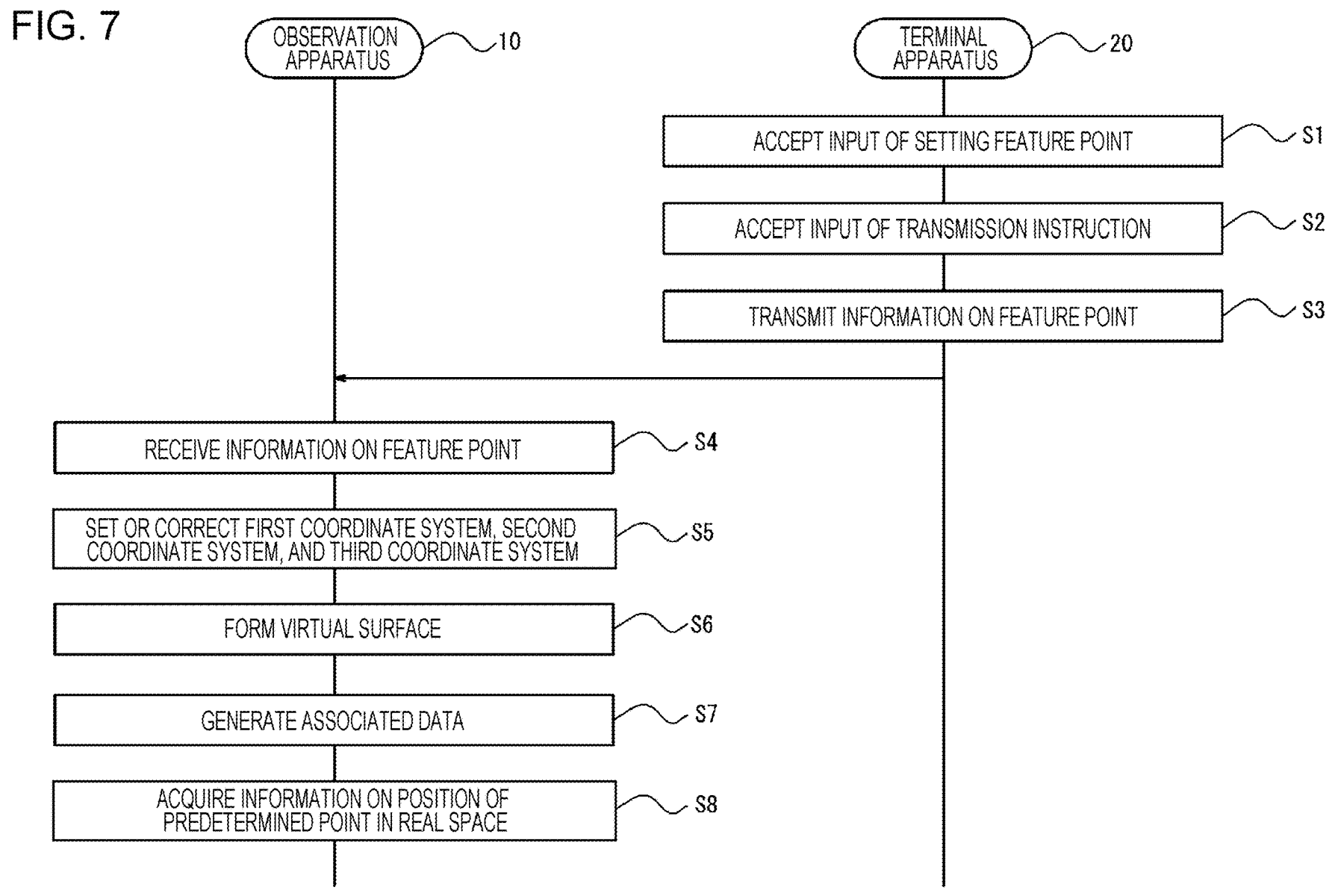

OBSERVATION APPARATUS 10

TERMINAL APPARATUS 20

S1 ACCEPT INPUT OF SETTING FEATURE POINT

S2 ACCEPT INPUT OF TRANSMISSION INSTRUCTION

S3 TRANSMIT INFORMATION ON FEATURE POINT

S4 RECEIVE INFORMATION ON FEATURE POINT

S5 SET OR CORRECT FIRST COORDINATE SYSTEM, SECOND COORDINATE SYSTEM, AND THIRD COORDINATE SYSTEM

S6 FORM VIRTUAL SURFACE

S7 GENERATE ASSOCIATED DATA

S8 ACQUIRE INFORMATION ON POSITION OF PREDETERMINED POINT IN REAL SPACE

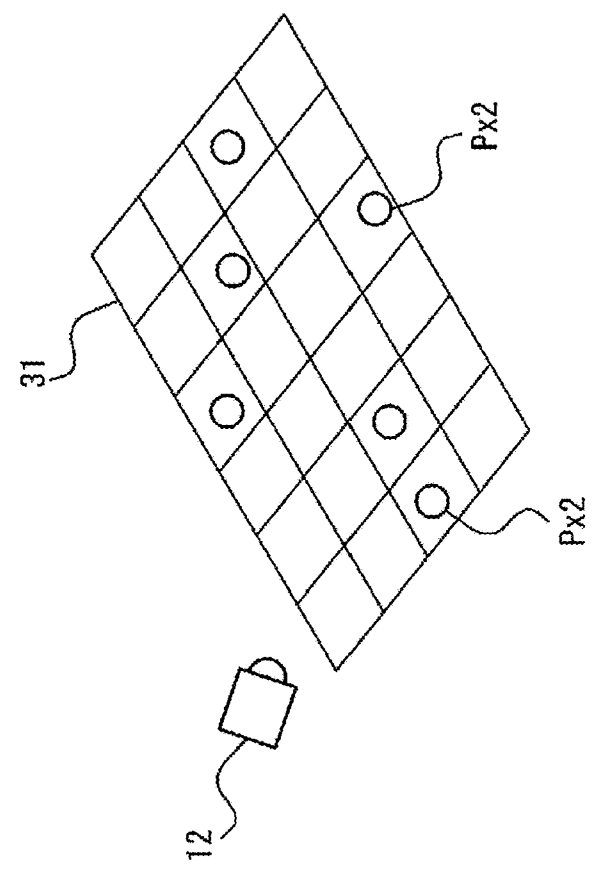
FIG. 8
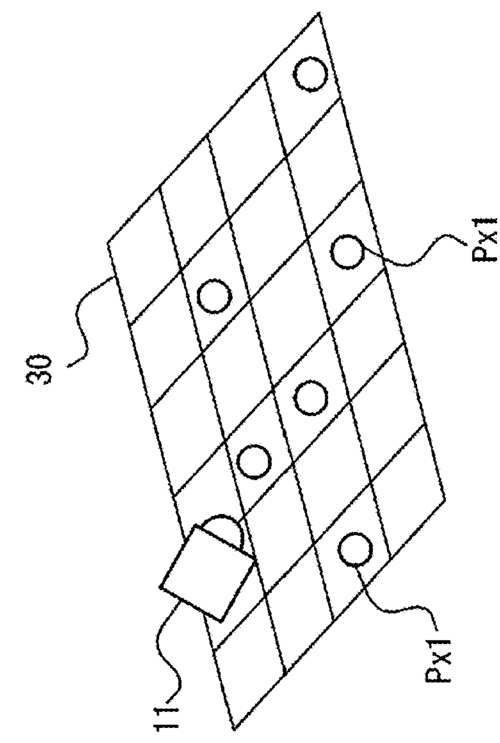

OBSERVATION APPARATUS AND OBSERVATION METHOD

CROSS-REFERENCE TO RELATED APPLICATIONS

This application claims priority from Japanese Patent Application No. 2022-054582 filed in Japan on Mar. 29, 2022, the entire disclosure of which is incorporated herein by reference.

TECHNICAL FIELD

The present disclosure relates to an observation apparatus and an observation method.

BACKGROUND OF INVENTION

In recent years, observation apparatuses that use multiple sensors have been widely used. For example, an observation apparatus disposed in a side strip uses multiple sensors to detect an object such as a vehicle or a pedestrian over a wide range.

Observation apparatuses that use multiple sensors need to perform calibration on each of the multiple sensors, to increase the detection accuracy of each of the multiple sensors. Accordingly, a method of performing calibration on each of multiple sensors is known (for example, Patent Literature 1).

CITATION LIST

Patent Literature

Patent Literature 1: Japanese Unexamined Patent Application Publication No. 2010-156609

SUMMARY

In an embodiment of the present disclosure, an observation apparatus includes a controller.

The controller is configured to:

perform calibration based on a feature point set for a first region among the first region, a second region, and a third region and information on a position of the feature point in a real space, the first region corresponding to both an observation region of a first sensor and an observation region of a second sensor, the second region corresponding to the observation region of the first sensor and not overlapping the first region, the third region corresponding to the observation region of the second sensor and not overlapping the first region; and acquire information on a position, in the real space, of a predetermined point in the observation region of the first sensor or the observation region of the second sensor.

In an embodiment of the present disclosure, an observation method includes:

performing calibration based on a feature point set for a first region among the first region, a second region, and a third region and information on a position of the feature point in a real space, the first region corresponding to both an observation region of a first sensor and an observation region of a second sensor, the second region corresponding to the observation region of the first sensor and not overlapping the first region, the third region corresponding to the observation region of the second sensor and not overlapping the first region; and acquiring information on a position, in the real space, of a predetermined point in the observation region of the first sensor or the observation region of the second sensor.

BRIEF DESCRIPTION OF THE DRAWINGS

FIG. 6 is a diagram for describing a first input and a second input.

FIG. 7 is a flowchart illustrating a flow of an observation method of the observation system illustrated in FIG. 1.

FIG. 8 is a diagram for describing calibration according to a comparative example.

DESCRIPTION OF EMBODIMENTS

Techniques of the related art for performing calibration have room for improvement. For example, an observation apparatus that uses multiple sensors may perform sensor fusion. Sensor fusion is a technique of integrally processing detection results of the multiple sensors. Calibration performed on each of the multiple sensors may reduce the detection accuracy achieved by sensor fusion. An embodiment of the present disclosure can provide an improved technique for performing calibration.

An observation apparatus of the present disclosure observes an observation region with multiple sensors. The observation apparatus of the present disclosure may be used for any application. For example, the observation apparatus of the present disclosure may be a roadside unit, a surveillance camera device, or the like.

An embodiment of an observation apparatus to which the present disclosure is applied is described below with reference to the drawings. In the embodiment below, the observation apparatus is a roadside unit.

(Configuration of Observation System)

Figure 1:
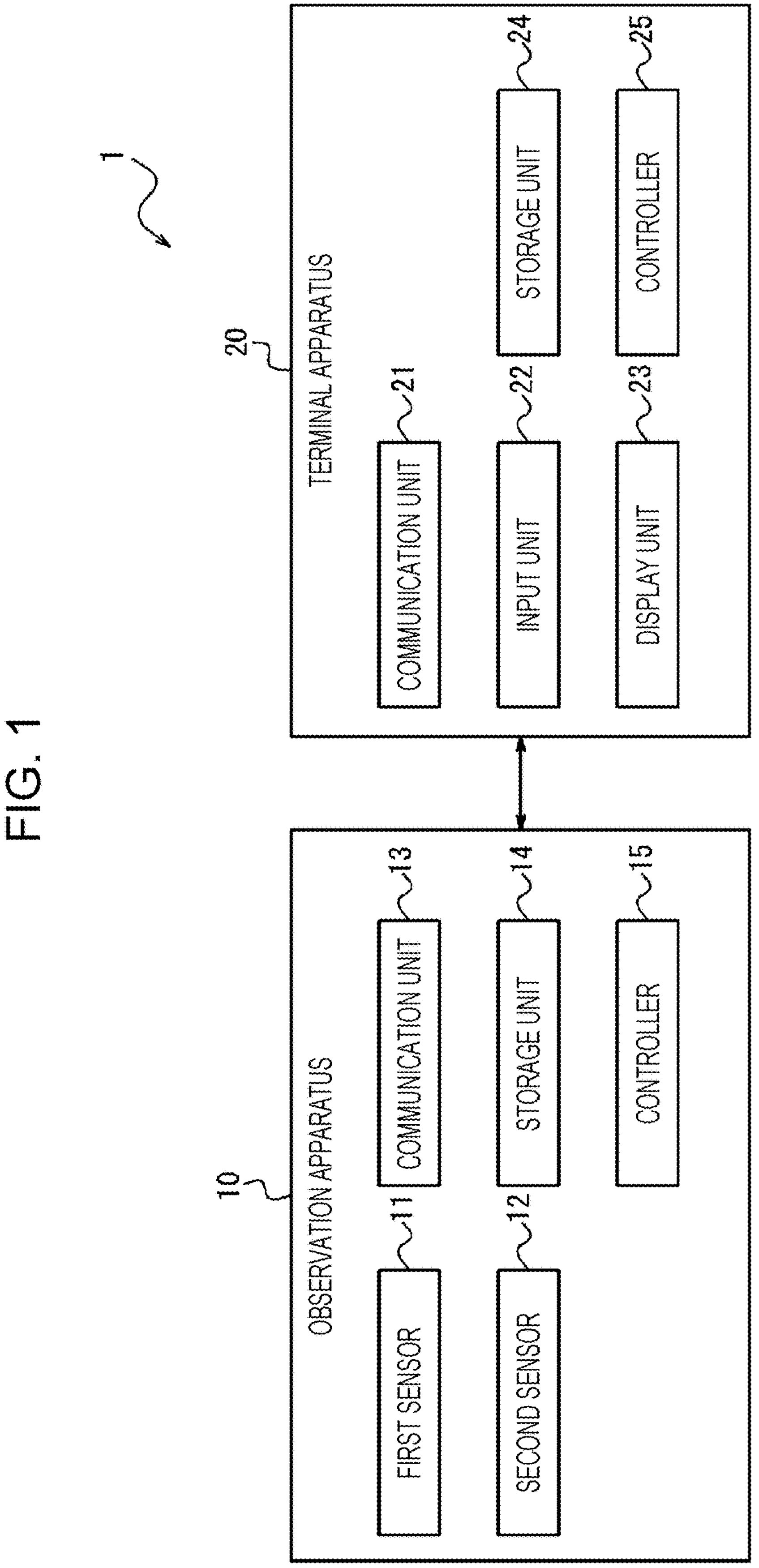
FIG. 1 is a block diagram of an observation system according to an embodiment of the present disclosure.

As illustrated in FIG. 1, an observation system 1 includes an observation apparatus 10. The observation system 1 further includes a terminal apparatus 20 when calibration of the observation apparatus 10 is performed. The observation apparatus 10 and the terminal apparatus 20 are communicably connected to each other via a communication line. The communication line includes at least one of a wired line or a wireless line.

The observation apparatus 10 is a roadside unit. The observation apparatus 10 is included in a communication system. The communication system including the observation apparatus 10 is, for example, a driving safety support communication system of ITS (Intelligent Transport Systems). The driving safety support communication system is also referred to as a driving safety support system or a wireless driving safety support system.

Figure 2:
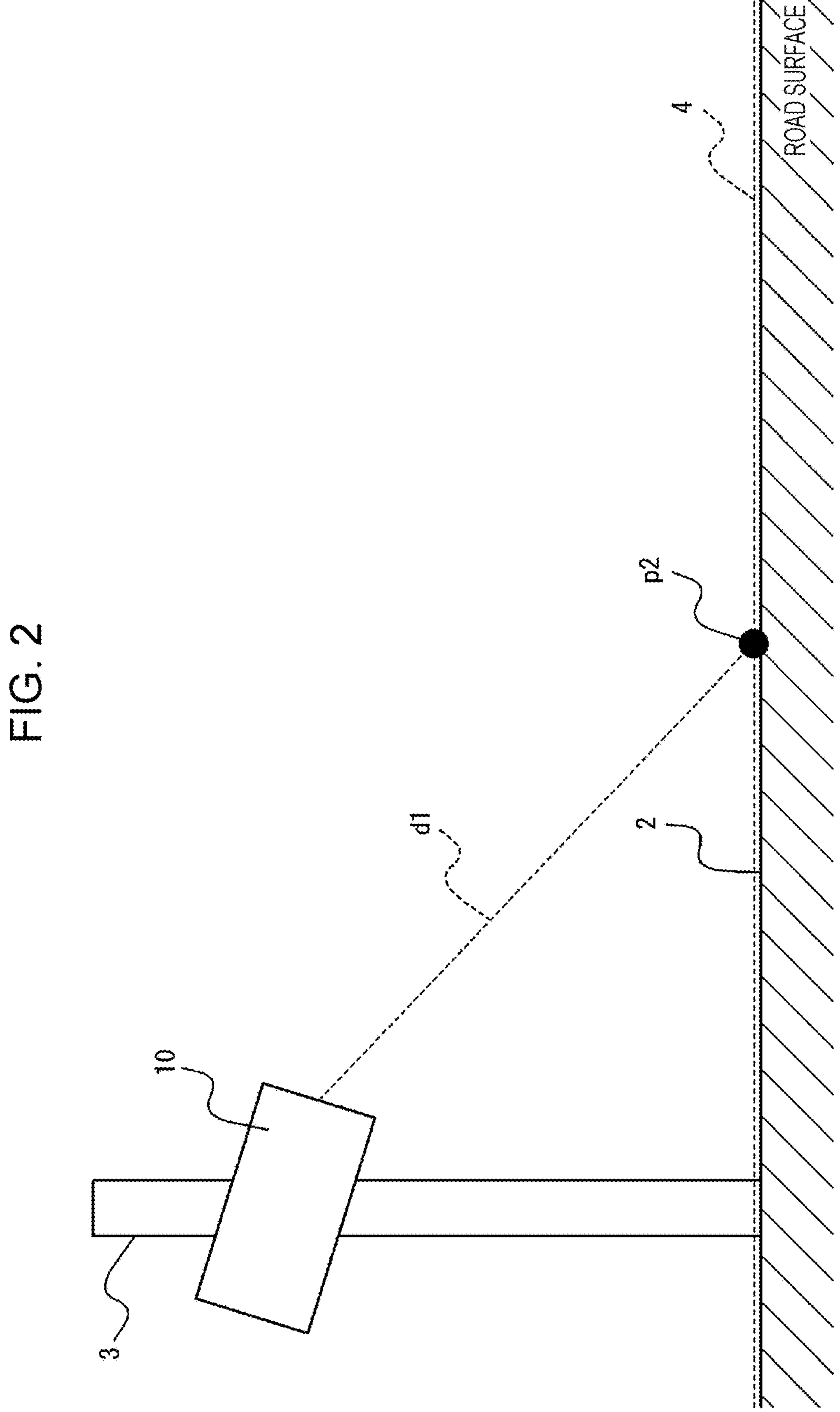
FIG. 2 is a diagram illustrating an installed state of an observation apparatus illustrated in FIG. 1.

The observation apparatus 10 is disposed, for example, in a side strip of an intersection or the like. The observation apparatus 10 detects an object located in an observation region. The observation region is, for example, a road surface 2 of a road illustrated in FIG. 2. For example, as illustrated in FIG. 2, the observation apparatus 10 is fixed to a structure 3 to be able to observe the road surface 2 that is the observation region. The structure 3 is, for example, a traffic signal device, a utility pole, or a street lamp. The observation apparatus 10 detects an object such as a vehicle or a pedestrian located in the observation region. The observation apparatus 10 notifies a nearby mobile object or the like of a detection result.

A user of the terminal apparatus 20 is an operator. When calibration of the observation apparatus 10 is performed, the operator connects the terminal apparatus 20 to the observation apparatus 10. The operator inputs information for use in calibration of the observation apparatus 10 from the terminal apparatus 20.

(Configuration of Observation Apparatus)

As illustrated in FIG. 1, the observation apparatus 10 includes a first sensor 11, a second sensor 12, a communication unit 13, a storage unit 14, and a controller 15. The observation apparatus 10 illustrated in FIG. 1 includes two sensors. However, the number of sensors included in the observation apparatus 10 is not limited to two. For example, the observation apparatus 10 may include three or more sensors depending on the application.

Figure 3:
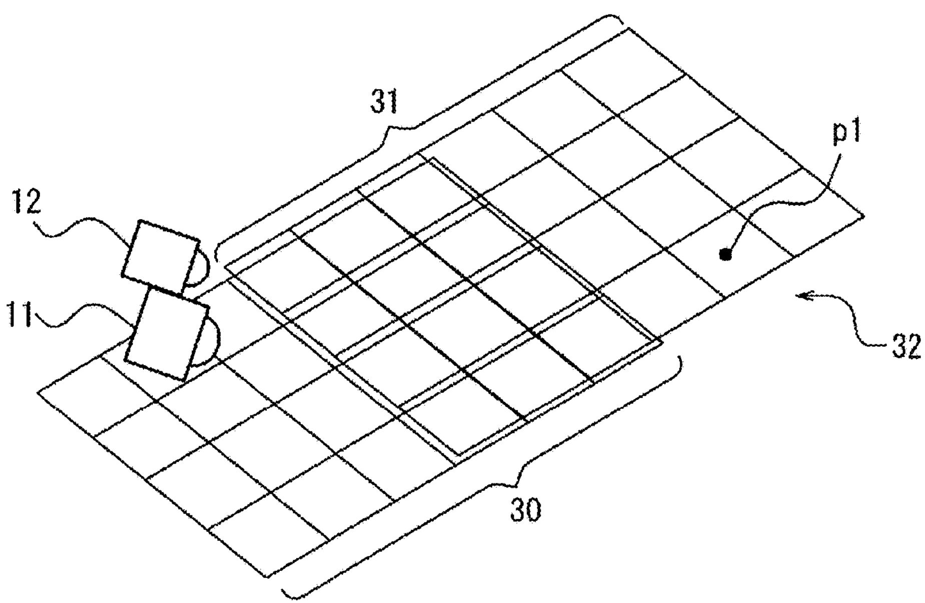
FIG. 3 is a diagram illustrating a first image and a second image.

The first sensor 11 images the observation region and generates a first image 30 illustrated in FIG. 3. The second sensor 12 images the observation region and generates a second image 31 illustrated in FIG. 3. A part of the observation region of the first sensor 11 and a part of the observation region of the second sensor 12 overlap each other. Since a part of the observation region of the first sensor 11 and a part of the observation region of the second sensor 12 overlap each other, sensor fusion of combining a detection result of the first sensor 11 and a detection result of the second sensor 12 can be performed. Note that the other part of the observation region of the first sensor 11 and the other part of the observation region of the second sensor 12 need not overlap each other. In FIG. 3, a positional relationship between the first image 30 and the second image 31 is illustrated to correspond to a positional relationship between the observation region of the first sensor 11 and the observation region of the second sensor 12. Thus, in FIG. 3, an overlapping region of the first image 30 and the second image 31 corresponds to an overlapping region of the observation region of the first sensor 11 and the observation region of the second sensor 12, that is, both the observation region of the first sensor 11 and the observation region of the second sensor 12. When the first image 30 and the second image 31 are not particularly distinguished from each other, those images may be collectively referred to as "images 32" below.

The first sensor 11 and the second sensor 12 are, for example, monocular cameras. The monocular cameras may be, for example, imaging devices such as visible light cameras or FIR (Far Infrared Rays) cameras. Each of the first sensor 11 and the second sensor 12 may be an image sensor such as a CMOS (Complementary Metal Oxide Semiconductor) or a CCD (Charge Coupled Device) included in a visible light camera or an FIR camera. The first sensor 11 and the second sensor 12 may be sensors of the same type, or may be sensors of different types. For example, one of the first sensor 11 and the second sensor 12 may be a visible light camera, and the other of the first sensor 11 and the second sensor 12 may be an FIR camera. Each of the first sensor 11 and the second sensor 12 may generate the images 32 at a predetermined frame rate. Note that the first sensor 11 and the second sensor 12 may be any sensors other than monocular cameras and image sensors. For example, the first sensor 11 and the second sensor 12 may be LiDAR (Light Detection And Ranging). In this case, the controller 15 may generate the images 32 of the observation region from point cloud data obtained by measurement with LiDAR. One of the first sensor 11 and the second sensor 12 may be a visible light camera or an FIR camera, and the other of the first sensor 11 and the second sensor 12 may be LiDAR.

The communication unit 13 includes at least one communication module capable of communicating with a mobile object on the road surface 2. The communication module is, for example, a communication module conforming to a road-to-vehicle communication standard. The communication unit 13 may perform, via this communication module, wireless communication with a mobile object on the road surface 2 in a 700 MHz band allocated to the ITS, for example.

The communication unit 13 includes at least one communication module capable of communicating with the terminal apparatus 20 via a communication line. The communication module is a communication module conforming to a communication line standard. The communication line standard is, for example, a wired communication standard or a short-range wireless communication standard including Bluetooth (registered trademark), infrared, and NFC (Near Field Communication).

The storage unit 14 includes at least one semiconductor memory, at least one magnetic memory, at least one optical memory, or a combination of at least two kinds of these memories. The semiconductor memory is, for example, a RAM (Random Access Memory) or a ROM (Read Only Memory). The RAM is, for example, an SRAM (Static Random Access Memory) or a DRAM (Dynamic Random Access Memory). The ROM is, for example, an EEPROM (Electrically Erasable Programmable Read Only Memory). The storage unit 14 may function as a main storage device, an auxiliary storage device, or a cache memory. The storage unit 14 stores data for use in operations of the observation apparatus 10 and data obtained by the operations of the observation apparatus 10.

The controller 15 includes at least one processor, at least one dedicated circuit, or a combination of a processor and a dedicated circuit. The processor is, for example, a general-purpose processor such as a CPU (Central Processing Unit) or a GPU (Graphics Processing Unit), or a dedicated processor specialized for specific processing. The dedicated circuit is, for example, an FPGA (Field-Programmable Gate Array) or an ASIC (Application Specific Integrated Circuit). The controller 15 performs processing related to the operations of the observation apparatus 10 while controlling each unit of the observation apparatus 10.

<Distance Measurement Processing>

The controller 15 acquires data of the image 32 from the first sensor 11 or the second sensor 12. The controller 15 performs image recognition processing on the data of the image 32, and thus detects an object from the data of the image 32. The image recognition processing is, for example, processing of pattern matching or of machine learning such as deep learning.

After detecting an object from the data of the image 32, the controller 15 acquires information on a position of the object in a real space. The information on the position of the object in the real space may be any information that allows the position of the object to be identified in the real space. As an example, the information on the position of the object in the real space may be position information of the object in the real space, or may be information on a distance from the observation apparatus 10 to the object in the real space. The position information of the object in the real space may be given by coordinates of a world coordinate system. The world coordinate system is a coordinate system set in a three-dimensional real space. The description is given below in which the information on the position of the object in the real space is information on the distance from the observation apparatus 10 to the object in the real space.

The controller 15 acquires the information on the distance from the observation apparatus 10 to the object in the real space by associated data. The associated data is generated in calibration described later. In the associated data, coordinates in the image 32 illustrated in FIG. 3 are associated with data of a distance, in the real space, from the observation apparatus 10 to the object appearing at a pixel at the coordinates in the image 32. The coordinates in the image 32 are given by a first coordinate system, a second coordinate system, or a third coordinate system as described later. For example, an object appearing at a pixel at coordinates p1 in the image 32 illustrated in FIG. 3 is located at a position p2 on the road surface 2 illustrated in FIG. 2. In this case, in the associated data, the coordinates p1 in the image 32 are associated with data of a distances d1 from the observation apparatus 10 to the position p2. The position p2 on the road surface 2 is calculated from a virtual surface 4 in calibration described later. The virtual surface 4 is formed, for example, by regarding the road surface 2, which is the observation region, in the real space as a single plane in calibration described later. The virtual surface 4 may also be formed by regarding the road surface 2 in the real space as a combination of multiple planes. In the present embodiment, the virtual surface 4 is formed by regarding the road surface 2 as a single plane. The controller 15 identifies coordinates of a pixel at which the object appears in the image 32, and acquires data on a distance associated with the identified coordinates from the associated data. The controller 15 thus acquires the information on the distance from the observation apparatus 10 to the object in the real space.

<Calibration Processing>

The controller 15 receives information on a feature point for use in calibration from the terminal apparatus 20 via the communication unit 13. The feature point is also referred to as a calibration point. The feature point is an arbitrary point (any point) appropriately selected by an operator from among structures or the like on the road surface 2 in the real space. The operator operates the terminal apparatus 20 and appropriately selects, as a feature point, a structure or the like appearing in the image 32 among structures or the like on the road surface 2.

Figure 4:
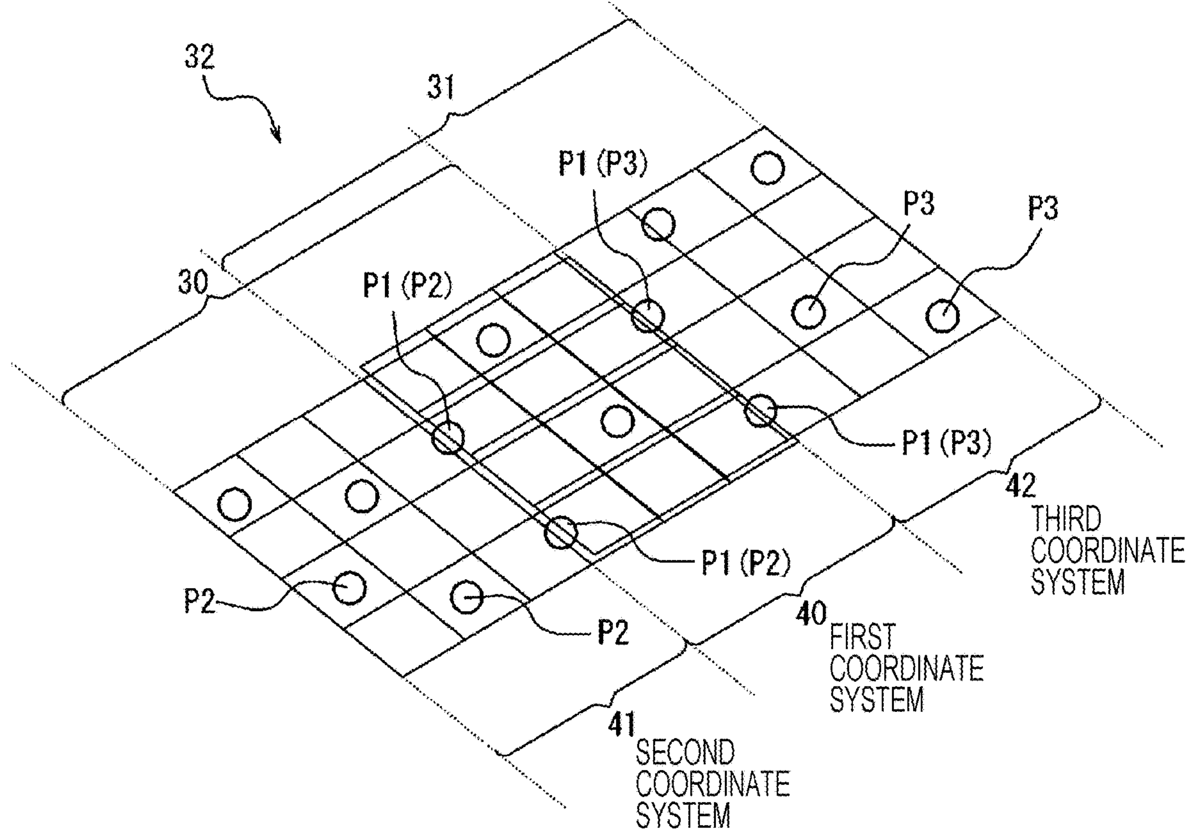
FIG. 4 is a diagram illustrating a first region, a second region, and a third region.

The operator sets the feature point separately for a first region 40, a second region 41, and a third region 42 illustrated in FIG. 4. A feature point set for the first region 40 is also referred to as a "feature point P1". A feature point set for the second region 41 is also referred to as a "feature point P2". A feature point set for the third region 42 is also referred to as a "feature point P3". At least one of the multiple feature points P1 may be set on a boundary between the first region 40 and the second region 41. The feature point P1 set on the boundary between the first region 40 and the second region 41 may serve as the feature point P2. At least one of the multiple feature points P1 may be set on a boundary between the first region 40 and the third region 42. The feature point P1 set on the boundary between the first region 40 and the third region 42 may serve as the feature point P3.

The first region 40 is a region corresponding to both the observation region of the first sensor 11 and the observation region of the second sensor 12. As in FIG. 3, FIG. 4 illustrates a positional relationship between the first image 30 and the second image 31 to correspond to a positional relationship between the observation region of the first sensor 11 and the observation region of the second sensor 12. That is, as in FIG. 3, in FIG. 4, the overlapping region of the first image 30 and the second image 31 corresponds to both the observation region of the first sensor 11 and the observation region of the second sensor 12. Thus, FIG. 4 illustrates the first region 40 as an overlapping region of the first image 30 and the second image 31.

The second region 41 is a region that corresponds to the observation region of the first sensor 11 and does not overlap the first region 40. The first image 30 includes the first region 40 and the second region 41.

The third region 42 is a region that corresponds to the observation region of the second sensor 12 and does not overlap the first region 40. The second image 31 includes the first region 40 and the third region 42.

The information on a feature point for use in calibration includes information on a position of the feature point in the real space. The information on the position of the feature point in the real space may be any information that allows the position of the feature point to be identified in the real space. As an example, the information on the position of the feature point in the real space may be position information of the feature point in the real space, or may be information on a distance from the observation apparatus 10 to the feature point in the real space. Hereinafter, the information on the position of the feature point in the real space is the position information of the feature point in the real space. The position information of the feature point in the real space may be position information identified by a GNSS (Global Navigation Satellite System). The position information of the feature point in the real space may be given by coordinates of the world coordinate system.

The information on the feature point for use in calibration includes position information of the feature point in the first region 40, the second region 41, or the third region 42. The first region 40, the second region 41, and the third region 42 are partial regions of the first image 30 or the second image 31. Thus, the first region 40, the second region 41, and the third region 42 include pixels. The position information of the feature point in the first region 40, the second region 41, or the third region 42 is position information of a pixel at which the feature point appears in the first region 40, the second region 41, or the third region 42. The position information of the feature point in the first region 40, the second region 41, and the third region 42 may be any information that allows the position of the feature point to be identified in the first region 40, the second region 41, and the third region 42, respectively.

The controller 15 sets the first coordinate system, based on the position information of the feature point P1 in the first region 40. The first coordinate system is a coordinate system set with respect to the first region 40. The first coordinate system may be a two-dimensional coordinate system. When the existing first coordinate system is not present, the controller 15 sets the first coordinate system. For example, when an operator newly disposes the observation apparatus 10 in a side strip of an intersection or the like, the existing first coordinate system is not present. Therefore, for example, when the operator newly disposes the observation apparatus 10 in a side strip of an intersection or the like, the controller 15 newly sets the first coordinate system. When the existing first coordinate system is present, the controller 15 corrects the existing first coordinate system, based on the position information of the feature point P1 in the first region 40. For example, when the operator performs maintenance work on the observation apparatus 10 that has already been installed, the existing first coordinate system is present. Therefore, for example, when the operator performs maintenance work on the observation apparatus 10 that has already been installed, the controller 15 corrects the existing first coordinate system, based on the position information of the feature point P1 in the first region 40.

The controller 15 sets the second coordinate system, based on the position information of the feature point P2 in the second region 41. The second coordinate system is a coordinate system set with respect to the second region 41. The second coordinate system is a coordinate system independent of the first coordinate system. The second coordinate system may be a two-dimensional coordinate system. When the existing second coordinate system is not present, the controller 15 sets the second coordinate system. For example, when the operator newly disposes the observation apparatus 10 in a side strip of an intersection or the like, the existing second coordinate system is not present. Therefore, for example, when the operator newly disposes the observation apparatus 10 in a side strip of an intersection or the like, the controller 15 newly sets the second coordinate system. When the existing second coordinate system is present, the controller 15 corrects the existing second coordinate system, based on the position information of the feature point P2 in the second region 41. For example, when the operator performs maintenance work on the observation apparatus 10 that has already been installed, the existing second coordinate system is present. Therefore, for example, when the operator performs maintenance work on the observation apparatus 10 that has already been installed, the controller 15 corrects the existing second coordinate system, based on the position information of the feature point P2 in the second region 41.

The controller 15 sets the third coordinate system, based on the position information of the feature point P3 in the third region 42. The third coordinate system is a coordinate system set with respect to the third region 42. The third coordinate system is a coordinate system independent of the first coordinate system and the second coordinate system. The third coordinate system may be a two-dimensional coordinate system. When the existing third coordinate system is not present, the controller 15 sets the third coordinate system. For example, when the operator newly disposes the observation apparatus 10 in a side strip of an intersection or the like, the existing third coordinate system is not present. Therefore, for example, when the operator newly disposes the observation apparatus 10 in a side strip of an intersection or the like, the controller 15 newly sets the third coordinate system. When the existing third coordinate system is present, the controller 15 corrects the existing third coordinate system, based on the position information of the feature point P3 in the third region 42. For example, when the operator performs maintenance work on the observation apparatus 10 that has already been installed, the existing third coordinate system is present. Therefore, for example, when the operator performs maintenance work on the observation apparatus 10 that has already been installed, the controller 15 corrects the existing third coordinate system, based on the position information of the feature point P3 in the third region 42.

The controller 15 regards the road surface 2 in the real space as a single plane, and forms the virtual surface 4 based on the position information of each of the feature point P1, the feature point P2, and the feature point P3 in the real space. The controller 15 generates associated data, based on the formed virtual surface 4 and the set or corrected first coordinate system, second coordinate system, and third coordinate system. For example, the controller 15 calculates, based on the virtual surface 4, a distance from the observation apparatus 10 to an object appearing at a pixel at coordinates in each of the first coordinate system, the second coordinate system, and the third coordinate system. The controller 15 associates the coordinates in each of the first coordinate system, the second coordinate system, and the third coordinate system with data of the calculated distance, and thus generates associated data.

However, the controller 15 may form the virtual surface 4 based only on the position information of the feature point P1 in the real space. The controller 15 may generate the associated data, based on the formed virtual surface 4 and the set or corrected first coordinate system.

The controller 15 may form the virtual surface 4, based on the position information of the feature point P1 in the real space and the position information of the feature point P2 in the real space. The controller 15 may generate the associated data, based on the formed virtual surface 4 and the set or corrected first coordinate system and second coordinate system.

The controller 15 may form the virtual surface 4, based on the position information of the feature point P1 in the real space and the position information of the feature point P3 in the real space. The controller 15 may generate the associated data, based on the formed virtual surface 4 and the set or corrected first coordinate system and third coordinate system.

(Configuration of Terminal Apparatus)

As illustrated in FIG. 1, the terminal apparatus 20 includes a communication unit 21, an input unit 22, a display unit 23, a storage unit 24, and a controller 25.

The communication unit 21 includes at least one communication module capable of communicating with the observation apparatus 10 via a communication line. The communication module is a communication module conforming to a communication line standard. The communication line standard is, for example, a wired communication standard or a short-range wireless communication standard including Bluetooth (registered trademark), infrared, and NFC.

The input unit 22 can accept an input from a user. The input unit 22 includes at least one input interface that can accept an input from a user. The input interface is, for example, a physical key, an electrostatic capacitive key, a pointing device, a touch screen integrated with a display, or a microphone. Note that the input interface is not limited to these devices.

The display unit 23 includes a display. The display is, for example, an LCD (Liquid Crystal Display) or an organic EL (Electro Luminescence) display. The display may form, for example, a touch panel display or a touch screen display together with a touch screen included in the input unit 22.

The storage unit 24 includes at least one semiconductor memory, at least one magnetic memory, at least one optical memory, or a combination of at least two kinds of these memories. The semiconductor memory is, for example, a RAM or a ROM. The RAM is, for example, an SRAM or a DRAM. The ROM is, for example, an EEPROM. The storage unit 24 may function as a main storage device, an auxiliary storage device, or a cache memory. The storage unit 24 stores data for use in operations of the terminal apparatus 20 and data obtained by the operations of the terminal apparatus 20.

The controller 25 includes at least one processor, at least one dedicated circuit, or a combination of a processor and a dedicated circuit. The processor is, for example, a general-purpose processor such as a CPU or a GPU, or a dedicated processor specialized for specific processing. The dedicated circuit is, for example, an FPGA or an ASIC. The controller 25 performs processing related to the operations of the terminal apparatus 20 while controlling each unit of the terminal apparatus 20.

Figure 5:
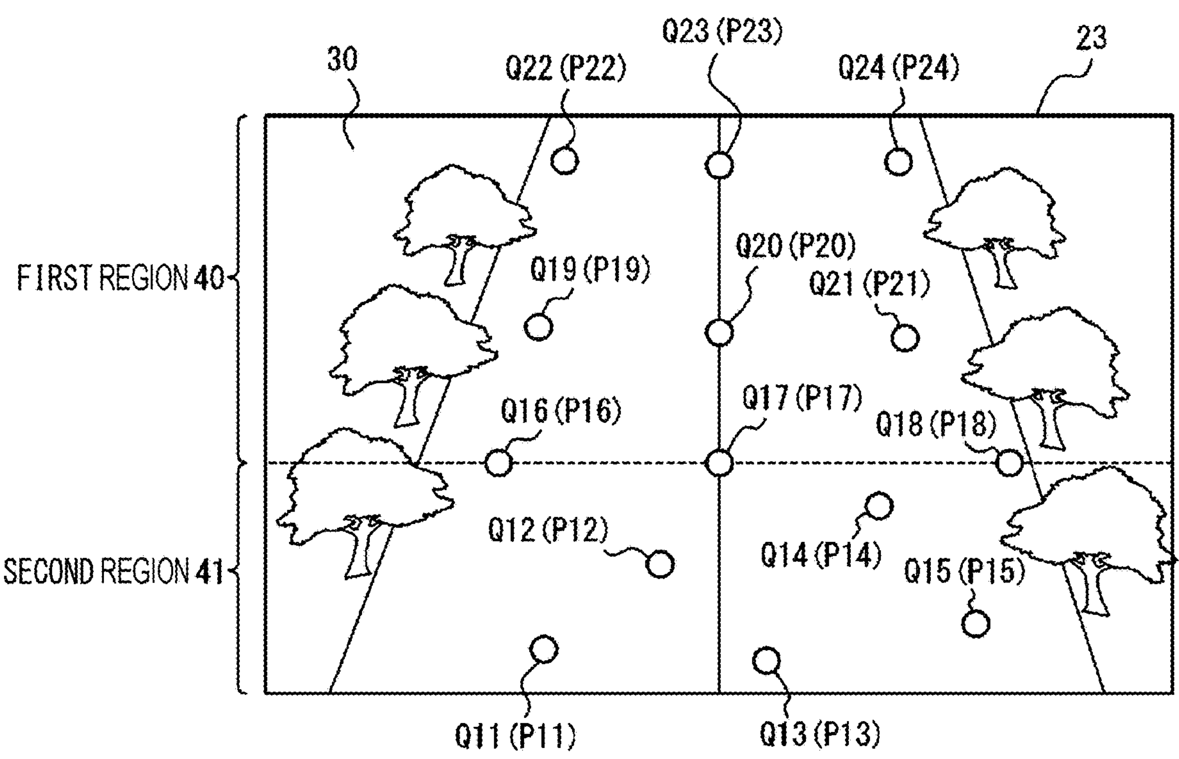
FIG. 5 is a diagram for describing setting of feature points.

The controller 25 may receive the data of the image 32 from the observation apparatus 10 via the communication unit 21, based on a user input accepted by the input unit 22, and cause the display unit 23 to display the received image 32 as illustrated in FIG. 5. In FIG. 5, the display unit 23 displays the first image 30.

The controller 25 accepts, via the input unit 22, an input of setting a feature point for at least one selected from the group consisting of the first region 40, the second region 41, and the third region 42. After causing the display unit 23 to display the image 32 as illustrated in FIG. 5, the controller 25 may accept, as a feature point, a point in the image 32 designated via the input unit 22. For example, in FIG. 5, the controller 25 accepts, as feature points P11 to P24, points Q11 to Q24 in the first image 30 designated via the input unit 22, respectively. For example, the operator operates a pointing device or the like of the input unit 22, and designates the points Q11 to Q24 from the first image 30 displayed on the display unit 23. As described later with reference to FIG. 6, the controller 25 accepts, via the input unit 22, an input of setting the accepted feature points P11 to P24.

The controller 25 may accept, via the input unit 22, a first input as the input of setting a feature point. The first input is an input indicating which of the first coordinate system, the second coordinate system, and the third coordinate system is to be set or corrected using the accepted feature point. For example, the controller 25 may cause the display unit 23 to display information illustrated in FIG. 6. In FIG. 6, fields for the first coordinate system, the second coordinate system, and the third coordinate system associated with the feature points P11 to P24 are displayed. As described above with reference to FIG. 5, the feature points P11 to P24 are feature points accepted from the user. In FIG. 6, the first input is to check a coordinate system field to be used for setting or correcting a feature point among the fields for the first coordinate system, the second coordinate system, and the third coordinate system associated with the feature point. That is, the operator operates the pointing device or the like of the input unit 22, and, as the first input, checks a coordinate system field to be used for setting or correcting a feature point among the fields for the first coordinate system, the second coordinate system, and the third coordinate system associated with the feature point. The feature points P16, P17, and P18 are set on the boundary between the first region 40 and the second region 41 as illustrated in FIG. 5. That is, the feature points P16, P17, and P18 can be used for setting or correcting both the first coordinate system and the second coordinate system. Thus, for the feature points P16, P17, and P18, the fields for both the first coordinate system and the second coordinate system are checked.

The first coordinate system cannot be set or corrected based on a feature point set only for the second region 41 or the third region 42. Thus, when the first input indicates that a feature point set only for the second region 41 or the third region 42 is to be used for setting or correcting the first coordinate system, the controller 25 may cause the display unit 23 to display a warning indication for the feature point. When the terminal apparatus 20 includes a speaker, the controller 25 may cause the speaker to output a buzzer sound instead of the warning indication.

The second coordinate system cannot be set or corrected based on a feature point set only for the first region 40 or the third region 42. Thus, when the first input indicates that a feature point set only for the first region 40 or the third region 42 is to be used for setting or correcting the second coordinate system, the controller 25 may cause the display unit 23 to display a warning indication for the feature point. When the terminal apparatus 20 includes a speaker, the controller 25 may cause the speaker to output a buzzer sound instead of the warning indication.

The third coordinate system cannot be set or corrected based on a feature point set only in the first region 40 or the second region 41. Thus, when the first input indicates that a feature point set only for the first region 40 or the second region 41 is to be used for setting or correcting the third coordinate system, the controller 25 may cause the display unit 23 to display a warning indication for the feature point. When the terminal apparatus 20 includes a speaker, the controller 25 may cause the speaker to output a buzzer sound instead of the warning indication.

The controller 25 may accept, via the input unit 22, a second input as the input of setting a feature point. The second input is an input indicating information on a position of a feature point in the real space. In the present embodiment, the second input is an input indicating position information of a feature point in the real space. However, the second input may be an input indicating any information that allows the position of the feature point to be identified in the real space. As another example, the second input may be information on a distance from the observation apparatus 10 to the feature point in the real space.

The controller 25 may cause the display unit 23 to display each feature point in association with information of the first input and information of the second input. For example, as illustrated in FIG. 6, the controller 25 may cause the display unit 23 to display each of the feature points P11 to P24 in association with the fields for the first coordinate system, the second coordinate system, and the third coordinate system and the position information of the feature point in the real space.

The controller 25 may accept, via the input unit 22, a third input indicating selection of a feature point that is not to be used in calibration from among the multiple feature points for which the first input and the second input have been accepted. In FIG. 6, the third input is to remove the checks for the fields for all the first coordinate system, the second coordinate system, and the third coordinate system associated with the feature point selected to not be used for calibration. For example, with reference to the information illustrated in FIG. 6, the operator selects a feature point having a low measurement accuracy of the position information in the real space to not be used for calibration. The operator selects a feature point located at a position above the road surface 2 to not be used for calibration. In FIG. 6, the operator operates the pointing device or the like of the input unit 22, and, as the third input, removes the checks from the fields for all the first coordinate system, the second coordinate system, and the third coordinate system associated with the feature point selected to not be used for calibration. For example, when the operator selects the feature points P12 and P14 to not be used for calibration, the check in the field for the second coordinate system associated with each of the feature points P12 and P14 is removed.

The controller 25 accepts, via the input unit 22, an input of a transmission instruction of information on a feature point. The operator performs this input via the input unit 22 after completing the input of setting a feature point. Upon accepting the input of the transmission instruction, the controller 25 acquires information on a feature point for use in calibration. The feature point for use in calibration is, for example, a feature point for which at least one selected from the group consisting of the fields for the first coordinate system, the second coordinate system, and the third coordinate system illustrated in FIG. 6 is checked. As described above, the information on a feature point for use in calibration includes the position information of the feature point in the real space and the position information of the feature point in the first region 40, the second region 41, or the third region 42.

The controller 25 acquires the position information of the feature point for use in calibration in the real space, based on the information of the second input.

The controller 25 acquires the position information of the feature point for use in calibration in the first region 40, the second region 41, or the third region 42, based on the information of the first input and the position information of the feature point on the screen of the display unit 23 illustrated in FIG. 5.

For example, the first coordinate system is set or corrected based on the position information, in the first region 40, of the feature point set for the first region 40. When the first input indicates that the feature point is to be used for setting or correcting the first coordinate system, the controller 25 converts position information of the feature point on the screen of the display unit 23 into position information in the first region 40, and thus acquires position information of the feature point in the first region 40.

For example, the second coordinate system is set or corrected based on the position information, in the second region 41, of the feature point set for the second region 41. When the first input indicates that the feature point is to be used for setting or correcting the second coordinate system, the controller 25 converts position information of the feature point on the screen of the display unit 23 into position information in the second region 41, and thus acquires position information of the feature point in the second region 41.

For example, the third coordinate system is set or corrected based on the position information, in the third region 42, of the feature point set for the third region 42. When the first input indicates that the feature point is to be used for setting or correcting the third coordinate system, the controller 25 converts position information of the feature point on the screen of the display unit 23 into position information in the third region 42, and thus acquires position information of the feature point in the third region 42.

Upon acquiring the information on the feature point for use in calibration, the controller 25 transmits the information on the feature point for use in calibration to the observation apparatus 10 via the communication unit 21.

(Operation of Observation System)

FIG. 7 is a flowchart illustrating a flow of an observation method of the observation system 1 illustrated in FIG. 1. Processing of steps S1, S2, and S3 corresponds to an example of an operation method of the terminal apparatus 20 according to the present embodiment. For example, upon connection of the terminal apparatus 20 to the observation apparatus 10, the observation system 1 starts the processing of step S1.

In the terminal apparatus 20, the controller 25 accepts, via the input unit 22, an input of setting a feature point for at least one selected from the group consisting of the first region 40, the second region 41, and the third region 42 (step S1). The controller 25 accepts, via the input unit 22, an input of a transmission instruction of information on a feature point (step S2). Upon accepting the input of the transmission instruction, the controller 25 acquires information on a feature point for use in calibration, and transmits the acquired information on the feature point to the observation apparatus 10 via the communication unit 21 (step S3).

In the observation apparatus 10, the controller 15 receives the information on the feature point from the terminal apparatus 20 via the communication unit 13 (step S4). The controller 15 sets or corrects the first coordinate system, the second coordinate system, and the third coordinate system, based on the position information of the feature point in the image 32 (step S5). The controller 15 forms the virtual surface 4, based on the position information of the feature point in the real space (step S6). The controller 15 generates associated data, based on the formed virtual surface 4 and the set or corrected first coordinate system, second coordinate system, and third coordinate system (step S7). Based on the associated data, the controller 15 acquires information on a position, in the real space, of a predetermined point in the observation region of the first sensor 11 or the observation region of the second sensor 12 (step S8). For example, upon detecting an object from data of the image 32, the controller 15 acquires information on the position of the object in the real space, as the information on the position of the predetermined point in the real space.

As described above, in the observation apparatus 10, the controller 15 performs calibration based on the feature point P1 set for the first region 40 among the first region 40, the second region 41, and the third region 42 illustrated in FIG. 4 and the position information of the feature point P1 in the real space. The controller 15 acquires information on a position, in the real space, of a predetermined point in the observation region of the first sensor 11 or the observation region of the second sensor 12. For example, the controller 15 performs calibration based on the information on the feature point P1 and generates associated data. Based on the associated data, the controller 15 acquires the information on the position, in the real space, of the predetermined point in the observation region of the first sensor 11 or the observation region of the second sensor 12.

As a comparative example, a case of setting a feature point Px1 and a feature point Px2 illustrated in FIG. 8 is considered. Note that although a case of correcting the coordinate system is described as the comparative example, the same or similar situation may occur when the coordinate system is set. The feature point Px1 is set for the first image 30. In the comparative example, the coordinate system of the first image 30 is corrected based on position information of the feature point Px1 in the first image 30. The feature point Px2 is set for the second image 31. In the comparative example, the coordinate system of the second image 31 is corrected based on the position information of the feature point Px2 in the second image 31. The feature point Px1 is set without taking into account the second image 31 and the observation region of the second sensor 12. The feature point Px2 is set without taking into account the first image 30 and the observation region of the first sensor 11. Thus, in the comparative example, the coordinate system of the first image 30 corrected based on the feature point Px1 may deviate from the coordinate system of the second image 31 corrected based on the feature point Px2. When sensor fusion for combining the detection result of the first sensor 11 and the detection result of the second sensor 12 is performed, the detection accuracy achieved by the sensor fusion decreases because of the deviation between the coordinate system of the first image 30 and the coordinate system of the second image 31. For example, for an object that is present in both the observation region of the first sensor 11 and the observation region of the second sensor 12, a distance from the observation apparatus 10 to the object measured using the first image 30 may deviate from a distance from the observation apparatus 10 to the object measured using the second image 31. When the coordinate system of the first image 30 deviates from the coordinate system of the second image 31, calibration may need to be repeatedly performed until the deviation between the coordinate system of the first image 30 and the coordinate system of the second image 31 reduces by some extent.

In contrast to such a comparative example, the observation apparatus 10 according to the present embodiment sets the feature point P1 for the first region 40. Based on the position information of the feature point P1 in the first region 40, the observation apparatus 10 can set or correct the first coordinate system which is set with respect to the first region 40. Both the first image 30 and the second image 31 include the first region 40. That is, the first coordinate system is a common coordinate system that corresponds to each of a partial region of the first image 30 and a partial region of the second image 31. The use of such a first coordinate system enables avoidance of the deviation between the coordinate system of the first image 30 and the coordinate system of the second image 31 which occurs in the comparative example. In the present embodiment, such a configuration can suppress a decrease in detection accuracy achieved by sensor fusion. In the present embodiment, calibration need not be repeatedly performed until the deviation between the coordinate system of the first image 30 and the coordinate system of the second image 31 reduces by some extent which is needed in the comparative example. The present embodiment thus can provide an improved technique for performing calibration.

In the observation apparatus 10, the controller 15 may acquire the information on the position of the predetermined point, based further on another feature point P2 or feature point P3 different from the feature point P1 and information on a position of the other feature point P2 or feature point P3 in the real space. Based on the feature point P2, the second coordinate system set for the second region 41 that does not overlap the first region 40 included in the first image 30 can be set or corrected. Such a configuration can reduce the deviation between the first coordinate system and the second coordinate system. Based on the feature point P3, the third coordinate system set for the third region 42 that does not overlap the first region 40 included in the second image 31 can be set or corrected. Such a configuration can reduce the deviation between the first coordinate system and the third coordinate system.

As illustrated in FIG. 4, at least one of the multiple feature points P1 may be set on the boundary between the first region 40 and the second region 41. Based on the feature point P1, i.e., the feature point P2, set on the boundary between the first region 40 and the second region 41, each of the first coordinate system and the second coordinate system can be set or corrected. Such a configuration can make the set or corrected first coordinate system and the set or corrected second coordinate system continuous at the boundary between the first region 40 and the second region 41. Continuousness of the set or corrected first coordinate system and the set or corrected second coordinate system can reduce the possibility that the detection result of the first sensor 11 deviates from the detection result of the second sensor 12 at the boundary between the first region 40 and the second region 41. For example, the continuousness can reduce the possibility that the distance from the observation apparatus 10 to the object measured using the first image 30 deviates from the distance from the observation apparatus 10 to the object measured using the second image 31 at the boundary between the first region 40 and the second region 41.

As illustrated in FIG. 4, at least one of the multiple feature points P1 may be set on the boundary between the first region 40 and the third region 42. Based on the feature point P1, i.e., the feature point P3, set on the boundary between the first region 40 and the third region 42, each of the first coordinate system and the third coordinate system can be set or corrected. Such a configuration can make the set or corrected first coordinate system and the set or corrected third coordinate system continuous at the boundary between the first region 40 and the third region 42. Continuousness of the set or corrected first coordinate system and the set or corrected third coordinate system can reduce the possibility that the detection result of the first sensor 11 deviates from the detection result of the second sensor 12 at the boundary between the first region 40 and the third region 42. For example, the continuousness can reduce the possibility that the distance from the observation apparatus 10 to the object measured using the first image 30 deviates from the distance from the observation apparatus 10 to the object measured using the second image 31 at the boundary between the first region 40 and the third region 42.

In the terminal apparatus 20, the controller 25 accepts, via the input unit 22, an input of setting a feature point for at least one selected from the group consisting of the first region 40, the second region 41, and the third region 42. Such a configuration can make the burden on the operator for the input of setting a feature point less than the burden on the operator for inputs of setting the feature points Px1 and Px2 respectively for the first image 30 and the second image 31 as illustrated in FIG. 8. For example, for the first region 40 included in both the first image 30 and the second image 31, the operator just needs to perform a single input of setting a feature point in the first region 40 and thus need not perform the input of setting the feature point for each of the first image 30 and the second image 31. The present embodiment thus can reduce the burden on the operator.

In the terminal apparatus 20, as illustrated in FIG. 6, the controller 25 may cause the display unit 23 to display each feature point in association with information of the first input and information of the second input. The controller 25 may accept, via the input unit 22, a third input indicating selection of a feature point that is not to be used in calibration from among the multiple feature points for which the first input and the second input have been accepted. Displaying each feature point in association with the information of the first input and the information of the second input on the display unit 23 can make it easier for the operator to select a feature point that is not to be used in calibration. For example, the operator can select a feature point having a low measurement accuracy of the position information in the real space to not be used for calibration, or select a feature point located at a position above the road surface 2 to not be used for calibration. This thus can increase the efficiency of calibration work of the operator. In response to acceptance of the third input, the terminal apparatus 20 can transmit, to the observation apparatus 10, information on a feature point that is selected by the operator and has a high measurement accuracy of the position information in the real space, as the information on the feature point for use in calibration. Thus, the observation apparatus 10 can perform calibration with a high accuracy.

While the present disclosure has been described based on the various drawings and embodiments, it is to be noted that a person skilled in the art can easily make various variations or corrections based on the present disclosure. Therefore, it is to be noted that these variations or corrections are within the scope of the present disclosure. For example, the functions and the like included in the individual functional units can be rearranged without causing any logical contradiction. Multiple functional units or the like may be combined into one or may be divided. The embodiments according to the present disclosure described above are not limited to strict implementation according to the respective embodiments described above, and may be implemented by appropriately combining the features or omitting part thereof. That is, a person skilled in the art can make various variations and corrections to the contents of the present disclosure based on the present disclosure. Therefore, these variations and corrections are within the scope of the present disclosure. For example, in each embodiment, each functional unit, each means, each step, or the like can be added to another embodiment or replaced with each functional unit, each means, each step, or the like in another embodiment without causing any logical contradiction. In each embodiment, multiple functional units, means, steps, or the like may be combined into one or may be divided. The embodiments of the present disclosure described above are not limited to strict implementation according to the respective embodiments described above, and may be implemented by appropriately combining the features or omitting part thereof.

For example, in the above-described embodiment, information on a position of a feature point in the real space is position information of the feature point in the real space. However, as described above, the information on a position of a feature point in the real space may be information on a distance from the observation apparatus 10 to the feature point in the real space. In this case, the second input may be information on the distance from the observation apparatus 10 to the feature point in the real space. In the terminal apparatus 20, the controller 25 may transmit the information on the distance from the observation apparatus 10 to the feature point in the real space, which is accepted as the second input via the input unit 22, to the observation apparatus 10 via the communication unit 21. In the observation apparatus 10, the controller 15 may form the virtual surface 4 based on the information on the distance from the observation apparatus 10 to the feature point in the real space, which is received from the terminal apparatus 20.

For example, in the observation apparatus 10 according to the above-described embodiment, the controller 15 acquires information on a distance from the observation apparatus 10 to a predetermined point in the real space, as the information on the position, in the real space, of the predetermined point in the observation region of the first sensor 11 or the observation region of the second sensor 12. However, the controller 15 may acquire position information of the predetermined point in the real space, as the information on the position, in the real space, of the predetermined point in the observation region of the first sensor 11 or the observation region of the second sensor 12. In this case, the controller 15 may associate the coordinates in the first coordinate system, the second coordinate system, and the third coordinate system with the position information, in the real space, of an object appearing at a pixel at the coordinates, and thus generate the associated data.

For example, the observation apparatus 10 according to the above-described embodiment includes two sensors, i.e., the first sensor 11 and the second sensor 12. However, the observation apparatus 10 may include three or more sensors. When the observation apparatus 10 includes three or more sensors, the controller 15 may perform processing that is the same as or similar to that of the above-described embodiment. An example of processing performed when the observation apparatus 10 includes three or more sensors is described below. A case where a part of the observation region of one sensor among the multiple sensors included in the observation apparatus 10 overlaps parts of the observation regions of all the other two or more sensors is referred to as a "first case". A case where a part of the observation region of the one sensor among the multiple sensors included in the observation apparatus 10 overlaps a part of the observation region of another sensor is referred to as a "second case". In the first case and the second case, the controller 15 may set a coordinate system that is the same as or similar to the first coordinate system described above in a region of the overlapping part of the observation regions of the multiple sensors included in the observation apparatus 10. In the first case and the second case, the controller 15 may set a different coordinate system in a region of a part of the observation region of each of the sensors included in the observation apparatus 10 that does not overlap the observation regions of the other sensors. In the first case and the second case, the controller 15 may set the coordinate system as described above and perform calibration processing in the same or similar manner as in the above-described embodiment. In the observation apparatus 10, when the first case and the second case described above occur at the same time, the controller 15 may perform both the processing for the first case and the processing for the second case.

In the present disclosure, expressions such as "first" and "second" are identifiers used to distinguish between the components. In the present disclosure, the components distinguished by expressions such as "first" and "second" may exchange the ordinal numerals assigned thereto. For example, the first sensor may exchange the identifiers "first" and "second" with the second sensor. The exchange of the identifiers is performed simultaneously. Even after the exchange of the identifiers, the components are distinguished from each other. The identifiers may be deleted. The components whose identifiers are deleted are distinguished from each other by reference signs. The expressions of the identifiers such as "first" and "second" in the present disclosure are not to be used as a basis for the interpretation of the order of the components and the existence of the identifier with a smaller number.

REFERENCE SIGNS

1 observation system
2 road surface
3 structure

4 virtual surface
10 observation apparatus
11 first sensor
12 second sensor
13 communication unit
14 storage unit
15 controller
20 terminal apparatus
21 communication unit
22 input unit
23 display unit
24 storage unit
25 controller
30 first image
31 second image
32 image
40 first region
41 second region
42 third region
P1 to P3, P11 to P24 feature point
Q11 to Q24 point
d1 distance
p1 coordinates
p2 position

The invention claimed is:

1. An observation apparatus comprising: a controller configured to: perform calibration based on a feature point set for a first region, a second region, and a third region, and information on a position of the feature point in a real space, the first region corresponding to both an observation region of a first sensor and an observation region of a second sensor, the second region corresponding to the observation region of the first sensor and not overlapping the first region, the third region corresponding to the observation region of the second sensor and not overlapping the first region; and acquire information on a position, in the real space, of a predetermined point in the observation region of the first sensor or the observation region of the second sensor.

2. The observation apparatus according to claim 1, wherein the information on the position of the feature point in the real space is position information of the feature point in the real space, and the controller is configured to:

form a virtual surface, based on the position information of the feature point in the real space;

set a first coordinate system with respect to the first region, based on position information of the feature point in the first region; and acquire the information on the position of the predetermined point in the real space, based on the virtual surface and the set first coordinate system.

3. The observation apparatus according to claim 1, wherein a first coordinate system with respect to the first region is set, the information on the position of the feature point in the real space is position information of the feature point in the real space, and the controller is configured to:

form a virtual surface, based on the position information of the feature point in the real space;

correct a first coordinate system, based on position information of the feature point in the first region; and acquire the information on the position of the predetermined point in the real space, based on the virtual surface and the corrected first coordinate system.

4. The observation apparatus according to claim 2, wherein the controller is configured to acquire the information on the position of the predetermined point in the real space, based further on another feature point that is different from the feature point and is set for the second region or the third region and information on a position of the other feature point in the real space.

5. The observation apparatus according to claim 4, wherein at least one of a plurality of feature points including the feature point and the other feature point is set on a boundary between the first region and the second region or a boundary between the first region and the third region.

6. The observation apparatus according to claim 4, wherein the information on the position of the other feature point in the real space is position information of the other feature point in the real space, and the controller is configured to:

form a virtual surface, based on the position information of the feature point in the real space and the position information of the other feature point in the real space;

set a second coordinate system with respect to the second region, based on position information of the other feature point in the second region or set a third coordinate system with respect to the third region, based on position information of the other feature point in the third region; and acquire the information on the position of the predetermined point in the real space, based on the virtual surface, the set first coordinate system, and the set second coordinate system or third coordinate system.

7. The observation apparatus according to claim 4, wherein a second coordinate system with respect to the second region is set, a third coordinate system with respect to the third region is set, the information on the position of the other feature point in the real space is position information of the other feature point in the real space, and the controller is configured to:

form a virtual surface, based on the position information of the feature point in the real space and the position information of the other feature point in the real space;

correct the second coordinate system, based on position information of the other feature point in the second region or correct the third coordinate system, based on position information of the other feature point in the third region; and acquire the information on the position of the predetermined point in the real space, based on the virtual surface, the corrected first coordinate system, and the corrected second coordinate system or third coordinate system.

8. The observation apparatus according to claim 4, wherein the first sensor is configured to observe the observation region of the first sensor and generate a first image, the second sensor is configured to observe the observation region of the second sensor and generate a second image, the first image includes the first region and the second region, and the second image includes the first region and the third region.

9. The observation apparatus according to claim 1, wherein one of the first sensor and the second sensor is a visible light camera, and an other of the first sensor and the second sensor is an FIR (Far Infrared Rays) camera.

10. The observation apparatus according to claim 1, wherein each of the first sensor and the second sensor is a visible light camera or an FIR camera.

11. The observation apparatus according to claim 1, wherein one of the first sensor and the second sensor is a visible light camera or an FIR camera, and an other of the first sensor and the second sensor is LiDAR (Light Detection And Ranging).

12. The observation apparatus according to claim 1, wherein each of the first sensor and the second sensor is LiDAR.

13. An observation method comprising: performing calibration based on a feature point set for a first region, a second region, and a third region, and information on a position of the feature point in a real space, the first region corresponding to both an observation region of a first sensor and an observation region of a second sensor, the second region corresponding to the observation region of the first sensor and not overlapping the first region, the third region corresponding to the observation region of the second sensor and not overlapping the first region; and acquiring information on a position, in the real space, of a predetermined point in the observation region of the first sensor or the observation region of the second sensor.

* * * * *